June 9, 1936.   W. A. EATON   2,043,610
BRAKE MECHANISM
Filed Nov. 22, 1932
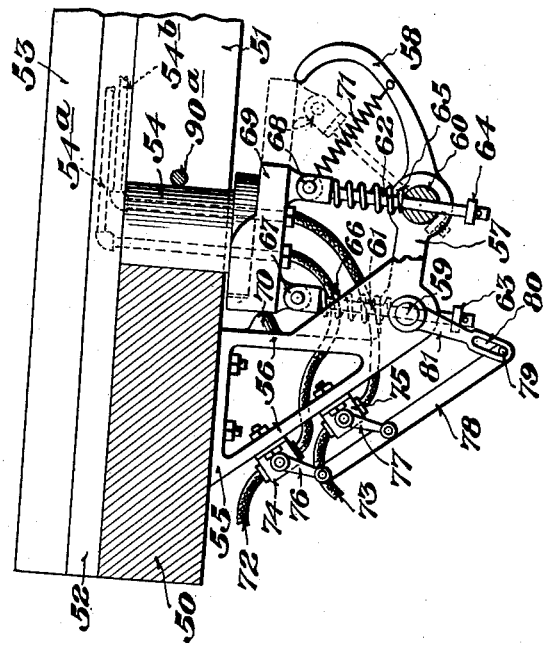

Patented June 9, 1936

2,043,610

UNITED STATES PATENT OFFICE 2,043,610

BRAKE MECHANISM

Wilfred A. Eaton, Pittsburgh, Pa., assignor to Bendix Westinghouse Automotive Air Brake Company, Pittsburgh, Pa., a corporation of Delaware Application November 22, 1932, Serial No. 643,902

8 Claims. (Cl. 280—33.1)

The present invention relates to tractor and trailer vehicles, and more particularly to means for coupling and uncoupling said vehicles and the hose lines or other connections therebetween.

It has heretofore been proposed, in the art relating to tractor-trailer vehicle trains, to simplify the coupling operation, and for the most part, the structures heretofore provided have effected the coupling operation by backing the tractor onto the trailer, the fifth wheel devices on the two vehicles then locking to effect the connection. However, if fluid pressure, vacuum or electric brakes are employed on the two vehicles, it has been necessary heretofore for the driver to manually effect a connection between the hose lines or electrical conductors on the two vehicles.

One of the objects of the present invention is to provide means for automatically connecting the hose lines or electrical conduits carried by the tractor and trailer vehicles respectively.

Another object of the invention is to provide means for automatically connecting the hose lines or electrical conduits on the tractor and trailer vehicles respectively when the two vehicles are brought together for mechanical connection.

A further object is to provide means operable on connection or disconnection of the hose lines of the tractor and trailer vehicles for controlling the passage of fluid under pressure through such hose lines.

A still further object is to provide valve means in the conduits connected to the braking system of one of the tractor or trailer vehicles which will be operated by the motion of certain parts of the vehicle-coupling mechanism to control the flow of fluid under pressure through such conduits.

Other novel features of the invention will be more fully understood from the following detailed description when taken in connection with the accompanying drawing. It is to be expressly understood, however, that the drawing is for purposes of illustration only and is not to be taken as a definition of the limits of the invention, reference being had for such purpose to the appended claims Referring to the drawing, the single figure of which discloses a tractor and trailer arrangement embodying the principles of the present invention, a tractor fifth-wheel device 50 is provided with rearwardly extending arms 51. Such fifth wheel device is shown connected to a trailer fifth wheel 52 connected to the under side of the trailer frame 53, and having depending from the lower side thereof a king-pin 54 which is engaged by the arms 51. Mounted on the lower side of the tractor fifth wheel device 50 is a bracket 55, the same having a depending portion 56, a horizontal portion 57 and an upwardly-extending stop portion 58. Journaled in the horizontal portion of the bracket member are two rotatable shafts 59 and 60 through which, in a direction radial thereof, extend rods 61 and 62, the construction being such that such rods may slide through the shafts. Nuts 63 and 64, disposed on the lower ends of rods 61 and 62, limit the upward movement thereof, and the rods are constantly urged toward their uppermost position by springs 65 and 66, coiled respectively about rods 61 and 62, and bearing at their lower ends against shafts 59 and 60 and at their upper ends against clevis members 67 and 68 formed or attached on the upper ends of the rods respectively. Attached to said rods by the clevis members at the upper ends thereof is an "air line" socket 69, the same being preferably circular and being provided on its upper face with a peripheral flange extending approximately around one-half the circumference thereof on the forward side, and on the interior of which the king-pin 54 is adapted to abut in the operation of coupling the tractor and trailer vehicles. A stop 70 is provided on the rear side of the depending bracket portion 56 and is adapted to limit the forward motion of the socket 69. The stop member 58 is so formed as to limit the rearward motion of the socket, and a spring 71, attached at one end to said stop member 58 and at its other end to the socket, normally urges said socket toward and against the stop 58. Flexible hose lines 72 and 73, connected to the fluid pressure braking system of the tractor, are connected to suitable ports in the socket 69 and are adapted to be connected therethrough to ports in the king-pin 54 to which are connected the pipes 54ª and 54ᵇ of the trailer fluid pressure braking system.

Means are provided for controlling the flow of fluid through the flexible hose lines 72, 73 in accordance with the position of the "air line" socket, and therefore in accordance with the coupling or uncoupling of the tractor and trailer vehicles. Such means comprise two valve casings 74, 75 attached preferably to the depending portion 56 of the bracket 55. Such valve casings are connected in the hose lines 72, 73 respectively and encase suitable valve devices which, when moved to one position, allow fluid under pressure to pass through the hose lines and, when moved to another position, shut off such flow. Such valve devices are rotatable and are connected to arms 76, 77 and are adapted to be rotated thereby. Arms 76, 77 are each connected, at the free ends thereof, to a link 78, the same having, at its lower end, a pin 79 which is surrounded by the slot 80 formed in a lever 81 which is attached to and rotatable with the shaft 59.

In the operation of the above described structure, when the tractor and trailer vehicles are uncoupled, the spring 71 holds the socket 69 against the stop 58, this being the normal position of these parts. In this position of the socket, the shaft 59 will be rotated because of the movement of rod 61 with the socket, to its most extreme position in a clockwise direction. Such movement of shaft 59 will rotate lever 81 in the same direction and cause such lever to move link 78 in an upward direction, thereby moving the arms 76 and 77 to their most extreme position in a clockwise direction and placing the valves within the casings 74 and 75 in their closed positions. In this manner the flow of fluid through hose lines 72 and 73 is shut off whenever the tractor and trailer vehicles are separated. As stated above, when the tractor and trailer vehicles are not coupled the spring 71 holds the socket against the stop 58. If the two vehicles are now brought together, the tractor, with tractor fifth wheel device 50, is moved rearwardly toward the trailer 53 and trailer king-pin 54, and the latter will abut the marginal flange of the socket. Further rearward movement of the tractor vehicle will cause the socket to move forwardly to the limit of its movement against the stop 70, at which time the king-pin 54 is at its locking position in relation to the tractor fifth wheel device and the two vehicles are coupled together. The ports in the king-pin 54, leading to the trailer fluid pressure braking system, will register with the ports in the socket before the latter is moved away from the stop 58 but no fluid under pressure will flow from the socket ports to said king-pin until the socket has reached the limit of its forward movement and abuts the stop 70. As the socket moves forwardly due to the relative movement between the king-pin and the tractor fifth wheel, the shafts 59 and 60 will be rotated in a counterclockwise direction due to their connection with the socket through rods 61 and 62, and such rotation of shaft 59 will move the arm 81 in the same direction, thereby exerting such a force on link 78 and attached arms 76 and 77 as to rotate the valves in the casing 74 and 75 in a counterclockwise direction until, at the time when the socket 69 abuts the stop 70, the valves will be rotated to their open position, thereby allowing free flow of fluid under pressure through the hose lines 72, 73. Any suitable locking pin 90a may then be inserted through suitable registering openings provided in the arms 51 for firmly securing the tractor and trailer fifth wheel devices together.

While one embodiment of the invention has been illustrated and described and reference has been made to fluid pressure operated brakes, it is to be understood that the invention may be readily employed with vehicles utilizing vacuum braking systems as well as electrical braking systems. It is therefore expressly understood that the invention is in no way limited other than by the appended claims, to which reference will be had for determining the limits thereof.

What is claimed is:

1. In combination, a tractor vehicle, a trailer vehicle, fluid conduits on said tractor and trailer respectively, means for coupling said vehicles together comprising a coupling device on the tractor, a king-pin on the trailer, a ported member carried by the tractor, connected to said tractor carried conduits and adapted to be engaged and moved by said king-pin during relative movement between said vehicles during coupling thereof, valvular means in said tractor conduits, and means operable during movement of said king-pin and member for operating said valvular means to establish communication between said tractor and trailer carried conduits.

2. In combination, a tractor vehicle, a trailer vehicle, fluid conduits on said tractor and trailer respectively, coupling means for said tractor and trailer vehicles including a king-pin device connected to said trailer carried conduits, and means for connecting said tractor and trailer-carried conduits, said last-named means including means pivoted on said tractor and adapted to be engaged and moved about its pivot by said king-pin device during coupling movement of said tractor and trailer vehicles.

3. In combination, a tractor vehicle, a trailer vehicle, fluid conduits on said tractor and trailer respectively, supporting means on said tractor vehicle, a socket connected to said tractor carried conduits, a plurality of rods pivotally connected to said socket and pivotally connected to said supporting means, means normally holding said socket against said supporting means, and means carried by said trailer and connected to said trailer carried conduits for engaging said socket.

4. In combination, a tractor vehicle, a trailer vehicle, fluid conduits on said tractor and trailer respectively, means mounted on said tractor and having a connection with said tractor carried conduits, a valve in said connection, and means operable by relative movement between said tractor and trailer vehicles during coupling thereof for operating said valve.

5. In combination, a tractor vehicle, a trailer vehicle, fluid conduits on said tractor and trailer respectively, means for coupling said vehicles together including a device carried by said trailer and a member carried by said tractor, said device being connected with said trailer carried conduits, a conduit coupling member carried by said tractor, adapted to be engaged and moved by said device and having connections with said tractor carried conduits, valves in said connections, and means operative upon engagement and movement of said conduit coupling member by said device during coupling of said vehicles for operating said valves to connect said tractor and trailer carried conduits through said conduit coupling member and device.

6. In combination, a tractor vehicle, a trailer vehicle, fluid conduits on said tractor and trailer respectively, a socket pivoted to said tractor vehicle and having a connection to said tractor carried conduits, a valve in said connection, a king-pin device on said trailer, and means operable upon engagement of said socket and said king-pin device for operating said valve.

7. In combination, a tractor vehicle, a trailer vehicle, fluid conduits on said tractor and trailer respectively, a fifth wheel device on said tractor, a socket pivoted on said fifth wheel device and having connections with said tractor carried conduits, valve means in said connections, a link connected to said socket and operated on movement thereof, connections between said link and said valves, a king-pin device on said trailer vehicle for engagement with said socket, and means connecting said king-pin device to said trailer carried conduits.

8. In combination, a tractor vehicle, a trailer vehicle, fluid conduits on said tractor and trailer respectively, a socket movably mounted on said tractor and communicating with said tractor carried conduits, valve means in said last named conduits, a coupling member on said tractor, a cooperating coupling member on said trailer adapted to engage and move said socket during the coupling operation between said members, and means operable during movement of said socket for opening said valves.

WILFRED A. EATON.